Sept. 27, 1955     T. W. RAMSAY     2,718,678

RESILIENT WEATHER STRIP

Filed April 23, 1953     2 Sheets-Sheet 1

Inventor
THOMAS W. RAMSAY
By Holcombe Wittwill & Bruebois
Attorney

Sept. 27, 1955 T. W. RAMSAY 2,718,678
RESILIENT WEATHER STRIP
Filed April 23, 1953 2 Sheets-Sheet 2
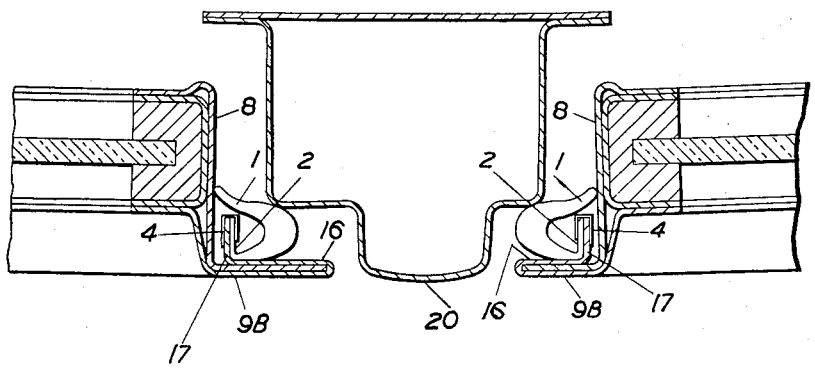
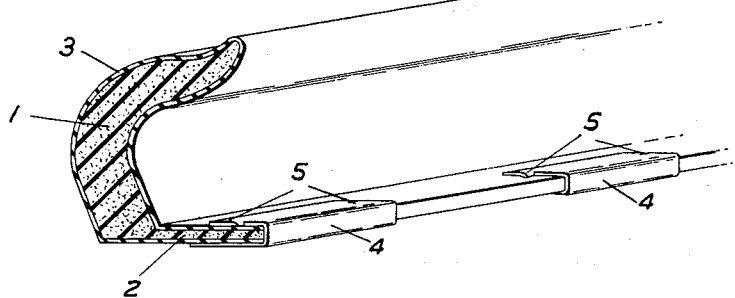
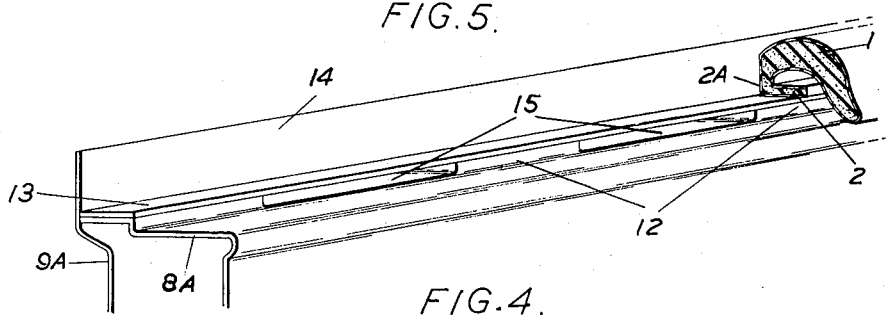
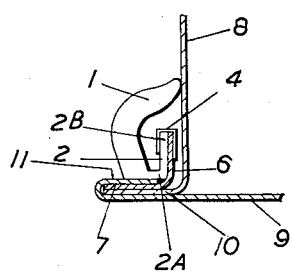
Inventor
THOMAS W. RAMSAY
By
Holcombe Wetherill & Brumbaugh
Attorney United States Patent Office 2,718,678
Patented Sept. 27, 1955

2,718,678
RESILIENT WEATHER STRIP

Thomas W. Ramsay, Headington, England, assignor to Morris Motors Limited, Cowley, England Application April 23, 1953, Serial No. 350,654

4 Claims. (Cl. 20—69)

This invention relates to means for sealing doors and windows against draughts, dust and the weather, and is particularly applicable to the doors of motor vehicles.

The attainment of completely satisfactory sealing of the door openings of motor vehicles against ingress of draughts, dust and so forth has long presented considerable difficulty. The common practice is to employ a rubber beading which, in addition to acting as a sealing device when deformed by the closing of the door, serves as a resilient buffer. The degree of sealing required is that capable of preventing ingress of fine dust into vehicles under the severe conditions encountered in territories subject to dust storms. Another important requirement in the case of mass-produced motor vehicles is that the procedure for installing the sealing device must be as straightforward as possible, in order that it may not occupy an undue amount of time on the production lines. In addition the sealing device, when fitted, has to remain securely in place and must not be unsightly.

In accordance with this invention a sealing device for doors and windows comprises a beading of resilient material such as rubber or sponge-rubber formed with a flexible attachment portion which extends unilaterally from the beading and, when mounted in place, presents two hinge-like limbs, the one to which the beading is rooted bearing against an abutment face on the door or window whilst the other limb is clamped by U-shaped spring clips to a flange or equivalent supporting means on the door or window. This arrangement possesses the advantage that, owing to the hinge-like action afforded by the resilient attachment portion, the beading (which constitutes the sealing element proper) can undergo a limited amount of displacement when deformed by the closing of the door or window, and consequently can accommodate itself to the available clearance, without impairing its security of attachment. The importance of this feature can be appreciated from a comparison with the well-known expedient of using adhesive to secure a rubber sealing element directly to one of the coacting surfaces in the case of motor vehicle doors. Every time the door is closed the adhesive bond between the sealing element and the surface to which it is attached becomes stressed. This effect, which is prone to cause the sealing element eventually to become detached, is especially marked where the sealing element is subjected to shearing stresses as that part of the door which adjoins the pivotal axis approaches the closed position.

Referring now to the accompanying drawings:

Figure 2 is a perspective view of the sealing strip, showing spring clips fitted to it;

Figure 4 is a fragmentary sectional plan showing how the sealing device can be fitted to a door of a motor vehicle;

Figure 5 is a perspective view illustrating another way of providing supporting means for enabling the sealing device to be fitted to a door of a motor vehicle;

Figure 7 is a fragmentary plan, in section, of two adjoining doors of a motor vehicle incorporating the invention, with the associated centre pillar.

Figure 3:
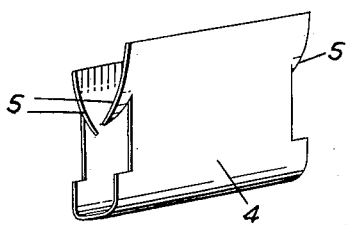
Figure 3 is a perspective view of one of the spring clips.
Figure 1:
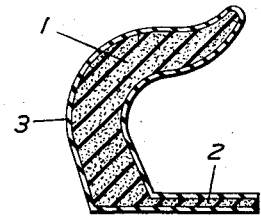
Figure 1 is a cross-section of a composite rubber sealing strip employed in carrying out the invention.

The composite sealing strip, which is shown in Figure 1 in its original undeformed state, is produced by moulding. It comprises a curved flap-like beading 1 of soft sponge-rubber the base of which is extended unilaterally to form a flat attachment portion 2, the whole being encased by a thin skin 3 of rubber (having a thickness of about one-sixty-fourth of an inch). In order that the sealing strip may be anchored to a supporting flange, U-shaped spring steel clips 4 (Fig. 2) are fitted at intervals to the attachment portion 2. These clips are of known type and have inwardly directed barbs 5 (Fig. 3) at each end.

In the arrangement represented in Figure 4, a supporting flange 6 for the sealing strip is formed by part of an angle-piece 7, which is incorporated in the joint between the inner and outer sheet metal panels 8 and 9 respectively of a motor vehicle door, and extends completely around the door. The angle-piece 7 is arranged on a flange 10 of the inner panel so that the supporting flange 6 is disposed substantially parallel to, and is spaced approximately one-sixteenth of an inch from, the jamb face 8 of the door. The margin of the outer panel 9 is then clinched over, and welded to, the parts 7 and 10. The sealing strip 1, having its clips 4 already fitted as indicated in Figure 2, is then offered to the supporting flange 6 and, by bending the attachment portion 2 through a right angle, the clips 4 are pushed or hammered one after the other on to the flange 6. As can be seen from Figure 4, the clips 4 embrace both that flange and the associated limb of the attachment portion 2, so that the latter is firmly clamped to the flange.

Since the installation of the sealing device necessitates its initially flat attachment portion 2 being constrained to present two hinge-like limbs 2A and 2B more or less at right angles to each other, it follows that the limb 2A, to which the sealing element is rooted, is urged elastically into contact with the abutment face presented by the door overlap 11. After the fitting operation has been performed, the free edge of the curved sealing element 1 either touches or closely adjoins the jamb face 8 of the door, with the result that the anchoring and supporting components are entirely concealed.

In the case of the alternative arrangement depicted in Figure 5, the jamb face 8A of the door is formed with a series of spaced projections 12 to which is welded a metal strip 13. The sealing strip is disposed with the limb 2A of its attachment portion bearing against the margin 14 of the outer panel 9A of the door, the limb 2B being clamped by the spring clips to the supporting flange presented by those parts of the strip 13 which overlie the gaps 15 between the projections 12.

Figure 6:
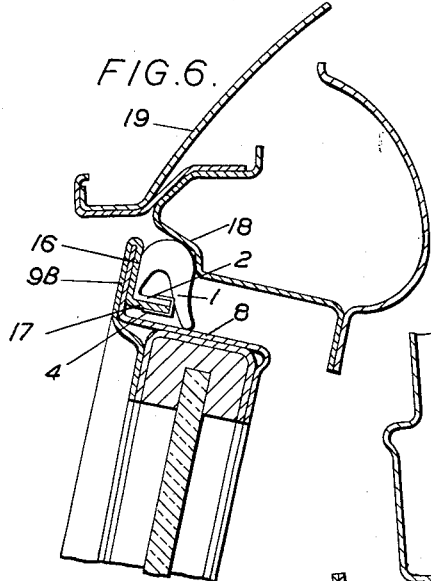
Figure 6 is a sectional elevation of the upper part of a door structure of a motor vehicle incorporating the invention.
Figure 8:
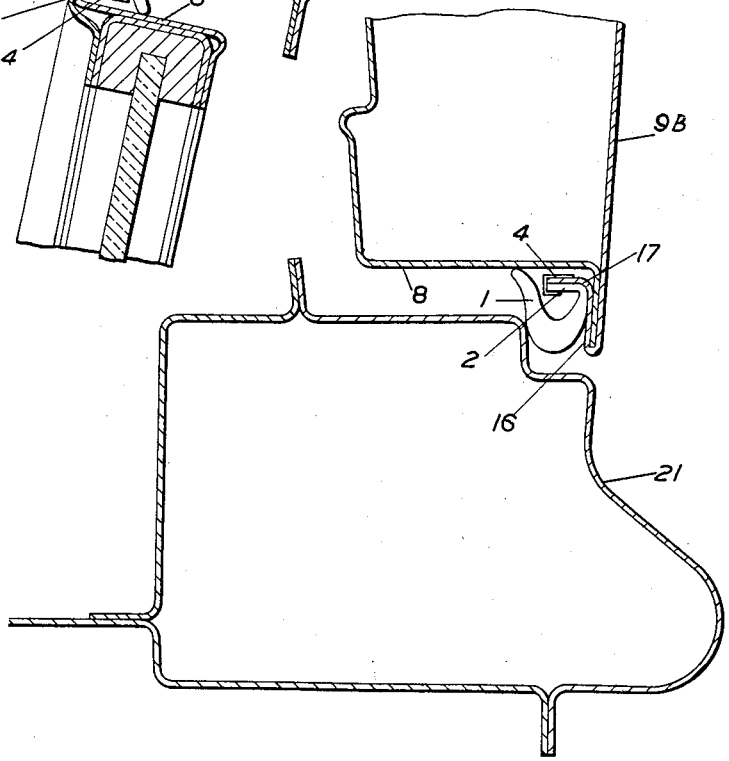
Figure 8 is a sectional end elevation of the lower part of the door structure.

Another way of providing the supporting flange for the sealing device is illustrated in Figures 6 to 8. In this case, instead of employing the separate angle-piece 7 of Figure 4, the outer panel 9B of the door is formed with two marginal flanges 16 and 17 at right angles to each other such that, when the door overlap has been created by the usual clinching operation, the integrally-formed flange 17 corresponds to the flange 6 of Figure 4 and serves to receive the spring clips 4. In Figure 6 the sealing strip 1 is shown engaging the top surround 18 of the door opening adjoining the roof panel 19.

Figure 7 shows the manner in which the sealing strips 1 on two adjoining doors co-operate with the centre pillar 20 of the vehicle body; and Figure 8 illustrates the arrangement at the bottom of the door, where the vehicle body incorporates a box-section sill member 21.

I claim:

1. Means for sealing doors and windows having peripherally flanged abutment faces against draughts, dust and the weather, comprising a beading of resilient rubber-like material formed with a thin flat flexible attachment portion which extends unilaterally from the beading and, when mounted in place, is bent along a line parallel to and spaced from its outer edge to present two hinge-like limbs, the one to which the beading is rooted bearing elastically against an abutment face on the door or window while the other limb bears against a portion thereof constituting a supporting means adjacent to and spaced from said abutment face and is clamped thereto by U-shaped spring clips embracing its free edge.

2. Sealing means according to claim 1, in which the supporting means is constituted by a metal strip welded to a series of projections spaced apart along the jamb face of the door or window, and the spring clips are fitted to those parts of the strip which overlie the gaps between the projections.

3. Sealing means according to claim 1 for a door comprising inner and outer sheet metal panels, in which the supporting flange for receiving the spring clips is formed by part of an angle-piece which is incorporated in the joint between the inner and outer door panels.

4. Sealing means according to claim 1 for a door compising inner and outer sheet metal panels, in which the supporting flange for receiving the spring clips is formed integrally with the outer panel of the door.

References Cited in the file of this patent
UNITED STATES PATENTS

| | | |
|---|---|---|
| 2,091,791 | Newman | Aug. 31, 1937 |
| 2,152,590 | Hall | Mar. 28, 1939 |
| 2,267,433 | Tea | Dec. 23, 1941 |
| 2,466,935 | Doty | Apr. 12, 1949 |